US012303755B2

(12) United States Patent
Souza et al.

(10) Patent No.: US 12,303,755 B2
(45) Date of Patent: May 20, 2025

(54) GOLF TOWEL SYSTEMS AND METHODS

(71) Applicants: Jarrod A. Souza, Arrington, TN (US); Gerardo Alvarado, College Grove, TN (US)

(72) Inventors: Jarrod A. Souza, Arrington, TN (US); Gerardo Alvarado, College Grove, TN (US)

( * ) Notice: Subject to any disclaimer, the term of this patent is extended or adjusted under 35 U.S.C. 154(b) by 433 days.

(21) Appl. No.: 17/980,768

(22) Filed: Nov. 4, 2022

(65) Prior Publication Data

US 2023/0338798 A1 Oct. 26, 2023

Related U.S. Application Data

(60) Provisional application No. 63/388,746, filed on Jul. 13, 2022, provisional application No. 63/332,843, filed on Apr. 20, 2022.

(51) Int. Cl.

| | |
|---|---|
| ***B08B 1/00*** | (2024.01) |
| ***A47K 10/02*** | (2006.01) |
| ***A63B 57/60*** | (2015.01) |
| ***B08B 1/14*** | (2024.01) |
| ***B08B 13/00*** | (2006.01) |
| *A63B 55/00* | (2015.01) |
| *H01F 7/02* | (2006.01) |

(52) U.S. Cl.

CPC ............ *A63B 57/60* (2015.10); *A47K 10/025* (2013.01); *B08B 1/143* (2024.01); *B08B 13/00* (2013.01); *A63B 55/408* (2015.10); *H01F 7/02* (2013.01)

(58) Field of Classification Search

CPC ....... A63B 57/60; A63B 55/408; B08B 13/00; B08B 1/006; A47K 10/025

See application file for complete search history.

(56) References Cited

U.S. PATENT DOCUMENTS

| | | | | | |
|---|---|---|---|---|---|
| D360,797 | S | * | 8/1995 | Evans | 383/117 |
| D363,404 | S | * | 10/1995 | Cute | D6/596 |
| D538,095 | S | * | 3/2007 | Turner | D6/603 |

(Continued)

FOREIGN PATENT DOCUMENTS

| | | | | |
|---|---|---|---|---|
| KR | 102288150 | B1 | * | 8/2021 |
| KR | 20220002351 | U | * | 10/2022 |
| WO | WO-2023146184 | A1 | * | 8/2023 |

*Primary Examiner* — Marc Carlson

(74) *Attorney, Agent, or Firm* — Smith Tempel Blaha LLC; Matthew T. Hoots

(57) ABSTRACT

A towel system and method are provided that allow at least first and second towel portions of a main towel of the system to be quickly and easily distinguished from one another to enable the user to assign different purposes to the different towel portions. A differentiation mechanism of the system differentiates the towel portions from one another to allow a user of the system to readily differentiate the first towel portion from the second towel portion to facilitate different uses of the towel portions. At least a first quick attachment and detachment (attachment/detachment) feature of the system is secured to the main towel at a preselected location of the main towel. A towel system attachment mechanism is secured to the main towel and is configured to be removably attached to an external structure or device to allow the system to be removably attached to the external device or structure.

19 Claims, 13 Drawing Sheets

(56) References Cited

U.S. PATENT DOCUMENTS

| | | | | | |
|---|---|---|---|---|---|
| D561,290 | S * | 2/2008 | Prior | D21/789 | |
| 7,955,683 | B1 * | 6/2011 | Ferrell | A63B 57/60 | 15/209.1 |
| 8,882,605 | B1 * | 11/2014 | Lee | A63B 57/207 | 224/901.2 |
| D1,048,769 | S * | 10/2024 | Francisco | D6/608 | |
| 2001/0037542 | A1 * | 11/2001 | Elliott | A63B 57/60 | 24/3.11 |
| 2005/0271857 | A1 * | 12/2005 | Brody | A63B 21/4025 | 5/420 |
| 2019/0060724 | A1 * | 2/2019 | Farina | A63B 60/36 | |
| 2020/0316442 | A1 * | 10/2020 | Wisnom | A63B 57/20 | |

* cited by examiner

GOLF TOWEL SYSTEMS AND METHODS

CROSS-REFERENCE TO RELATED APPLICATIONS

The present application is a nonprovisional patent application claiming priority to, and the benefit of the filing date of, U.S. provisional application Ser. No. 63/332,843, filed on Apr. 20, 2022, entitled "IMPROVED GOLF TOWEL SYSTEM," and U.S. provisional application Ser. No. 63/388,746, filed on Jul. 12, 2022, entitled "IMPROVED GOLF TOWEL SYSTEM," both of which are incorporated by reference herein in their entireties.

TECHNICAL FIELD

The present disclosure relates to systems and methods for towels used in the sport of golf and other sports and, more particularly, to a novel towel system configured to define multiple portions for separate and varying uses.

BACKGROUND

In the game of golf, for example, it is common for players to attach a so-called "golf towel" to their bag. Golf towels known in the art are fairly simple devices, usually comprised of a two or three square foot fabric towel fitted with a grommet or eyelet. The golf towel can thus be "hung" from the side of the bag for convenient access via a clip device on the bag that is received through the grommet. In application, a golfer may rely on the golf towel for any number of uses including, but not limited to, drying cleaned hands, wiping sweat from a brow or hands, cleaning mud from golf club heads, keeping club handles dry before a shot, etc. Moreover, many golfers like to carry a towel with them during play, such as when walking away from their golf cart and bag to a green for a chip and putt (to protect a club's grip from moisture, for example, golfers often use a golf towel beneath a club laying upon the ground while using a different club to make a golf shot).

The multiple common uses for a golf towel present a problem in the art because it can be difficult for golfers to differentiate a "clean" portion of a golf towel (such as might be designated for wiping sweat from a golfer's brow) from a "dirty" portion (such as might be designated for wiping mud from a golf club head). Also, the desire by many golfers to carry a golf towel on their person during play presents a problem in the art because golf towels known in the art are inconvenient to constantly engage and disengage from a clip device hanging off a golf bag. Therefore, there is a need in the art for a new and novel golf towel system that addresses the above articulated needs in the art as well as other needs.

SUMMARY

Exemplary embodiments of novel improved golf towel systems and methods are disclosed. In accordance with an exemplary or representative embodiment, the towel system comprises a main towel, a differentiation mechanism, at least a first quick attachment and detachment (attachment/detachment) feature, and a towel system attachment mechanism. The main towel comprises at least a first towel portion and a second towel portion. Each towel portion has at least a front side, a rear side, a top side, a bottom side, a left side and a right side. The left and right sides of the first and second towel portions, respectively, are joined together. The differentiation mechanism distinguishes the first towel portion from the second towel portion to allow a user of the golf towel system to readily differentiate the first towel portion from the second towel portion to facilitate different uses or purposes by the user of the first and second towel portions. The first quick attachment/detachment feature is secured to the main towel at a preselected location of the main towel. The towel system attachment mechanism is secured to the main towel and is configured to be removably attached to a structure or device that is external to the golf towel system to thereby allow the golf towel system to be removably attached to the external structure or device.

In accordance with another representative, or exemplary, embodiment the towel system comprises a main towel, a differentiation mechanism, at least a first quick attachment/detachment feature, a detachable towel, and towel system attachment mechanism. The main towel comprises at least a first towel portion and a second towel portion, each of which has at least a front side, a rear side, a top side, a bottom side, a left side and a right side. The left and right sides of the first and second towel portions, respectively, are joined together. The differentiation mechanism differentiates the first towel portion from the second towel portion to allow a user of the golf towel system to readily differentiate the first towel portion from the second towel portion to facilitate different uses or purposes by the user of the first and second towel portions. The first quick attachment/detachment feature is secured to the main towel at a preselected location of the main towel. The detachable towel is configured to be removably attached to the main towel. The detachable towel has a second quick attachment/detachment feature secured thereto that is configured to detachably couple with the first quick attachment/detachment feature to enable the detachable towel to be removably attached to the main towel. The towel system attachment mechanism is secured to the main towel and is configured to be removably attached to a structure or device that is external to the golf towel system to thereby allow the golf towel system to be removably attached to the external structure or device.

These and other features and advantages of the systems and methods will become apparent from the following description, drawings and claims.

DETAILED DESCRIPTION

Figure 1:
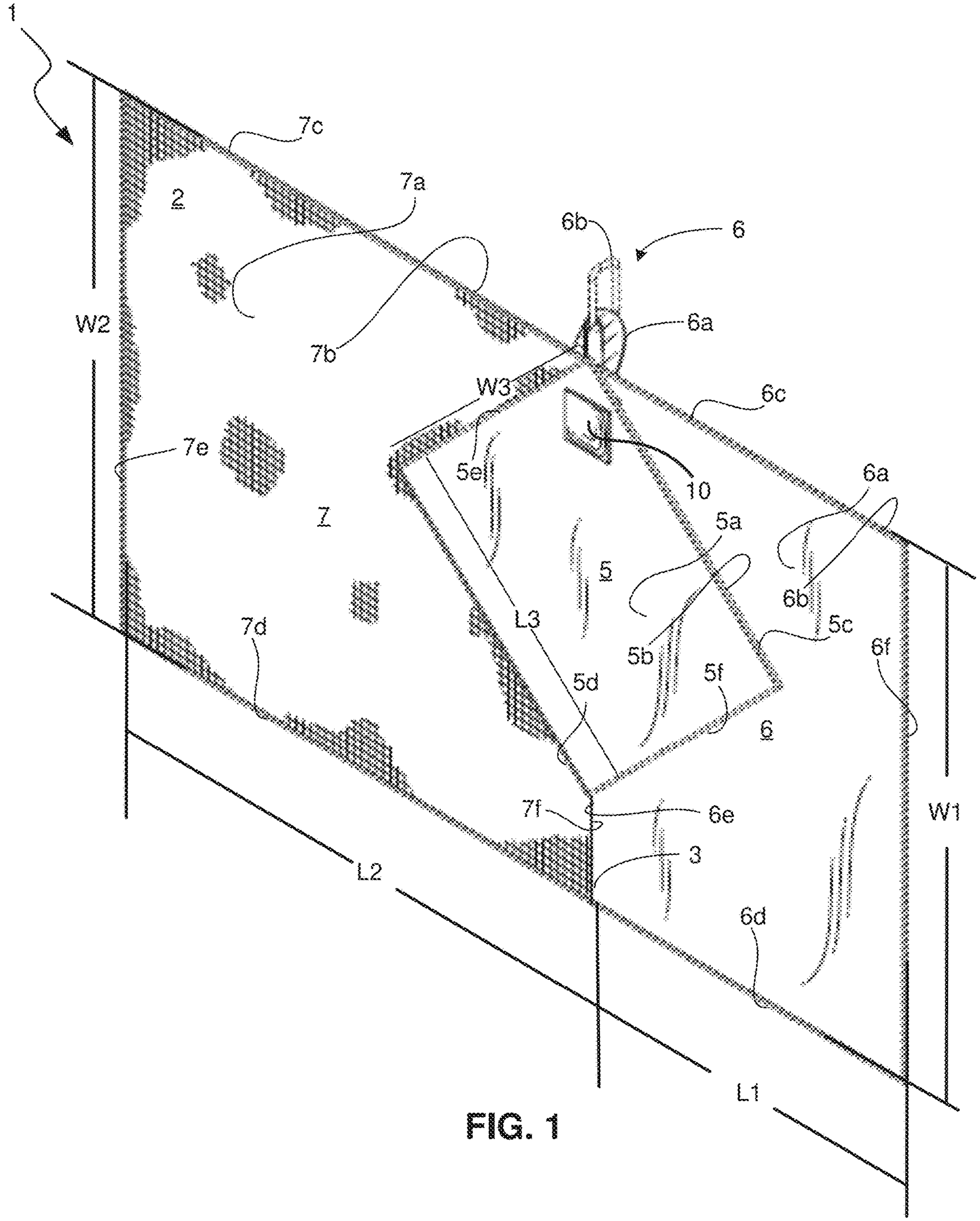
FIG. 1 is a top and front perspective view of a golf towel system in accordance with a representative embodiment.
Figure 2:
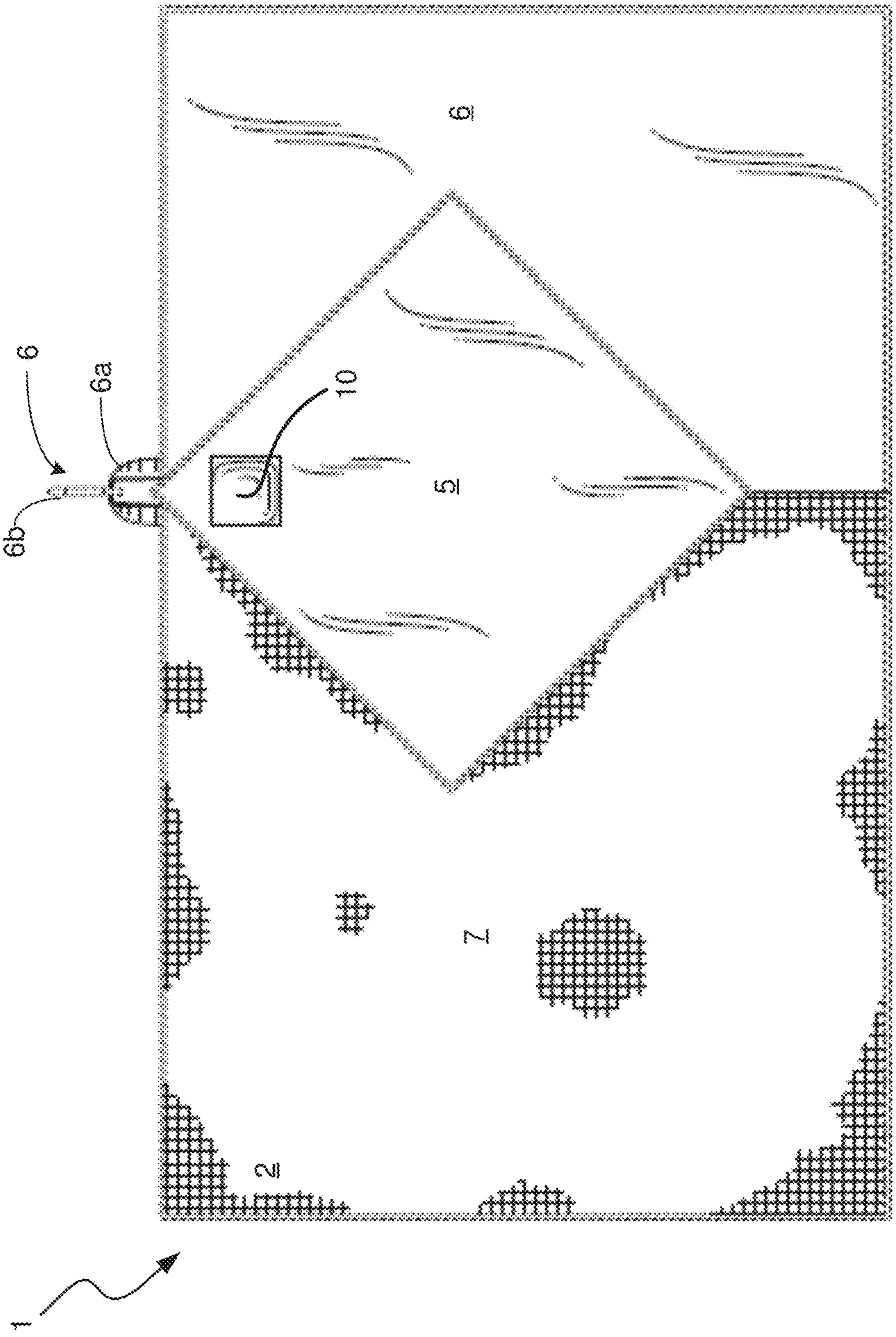
FIG. 2 is a front view of the golf towel system shown in FIG. 1 in accordance with a representative embodiment.
Figure 3:
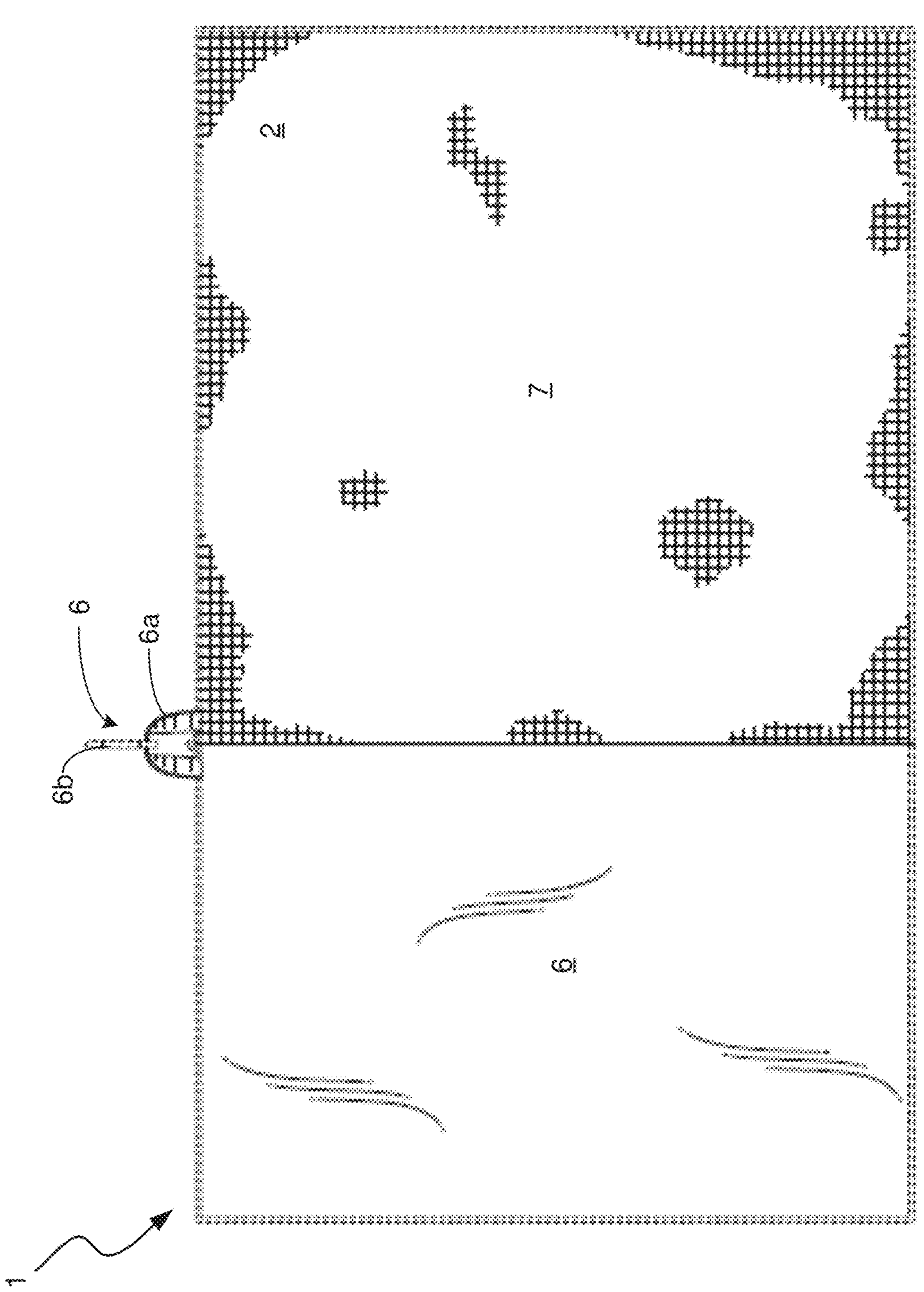
FIG. 3 is a rear view of the golf towel system shown in FIG. 1 in accordance with a representative embodiment.
Figure 4:
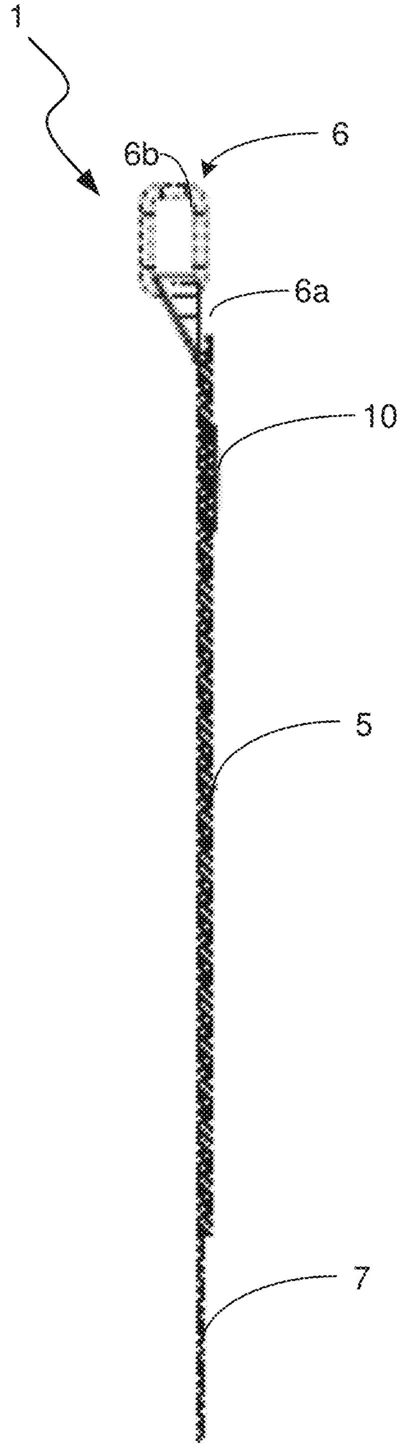
FIG. 4 is a left-side view of the golf towel system shown in FIG. 1 in accordance with a representative embodiment.
Figure 5:
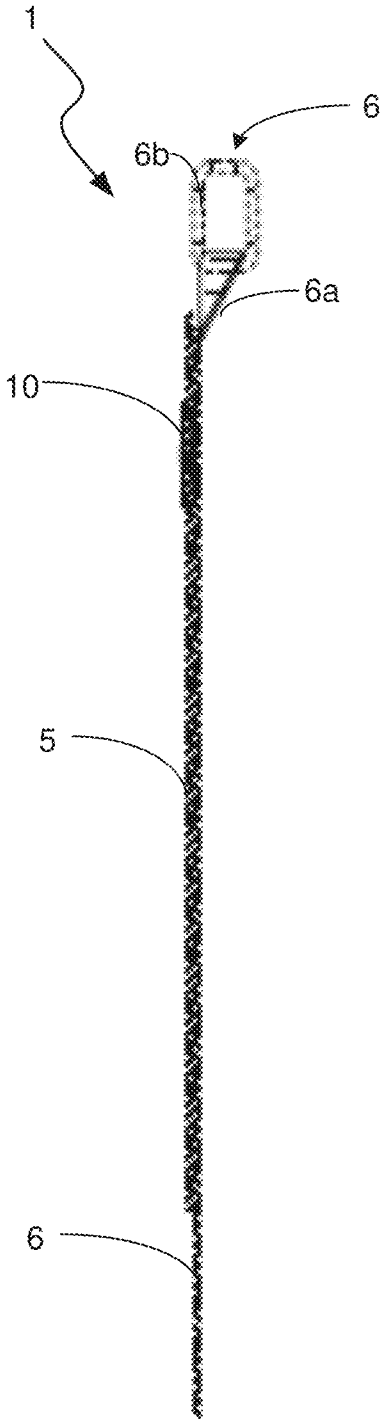
FIG. 5 is a right-side view of the golf towel system shown in FIG. 1 in accordance with a representative embodiment.
Figure 6:
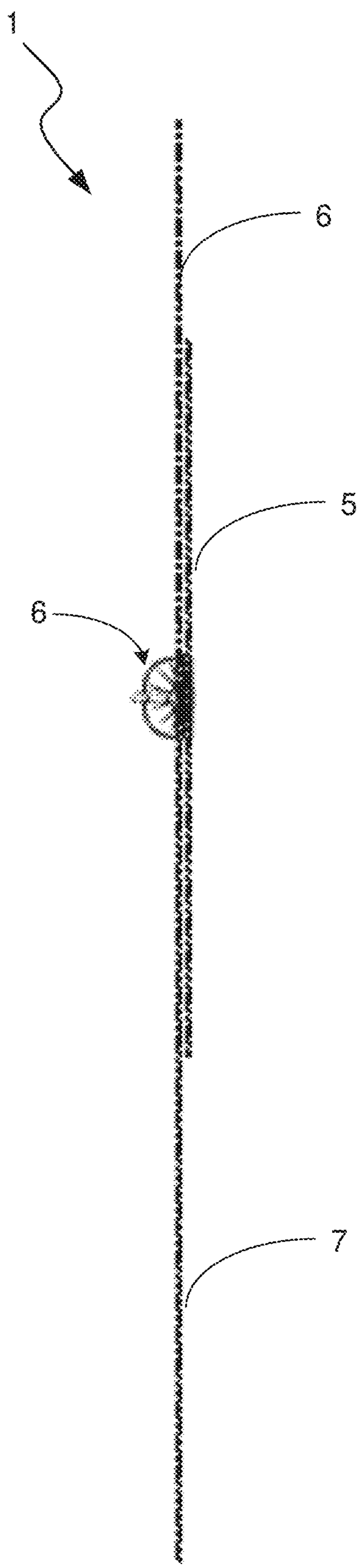
FIG. 6 is a top view of the golf towel system shown in FIG. 1 in accordance with a representative embodiment.
Figure 7:
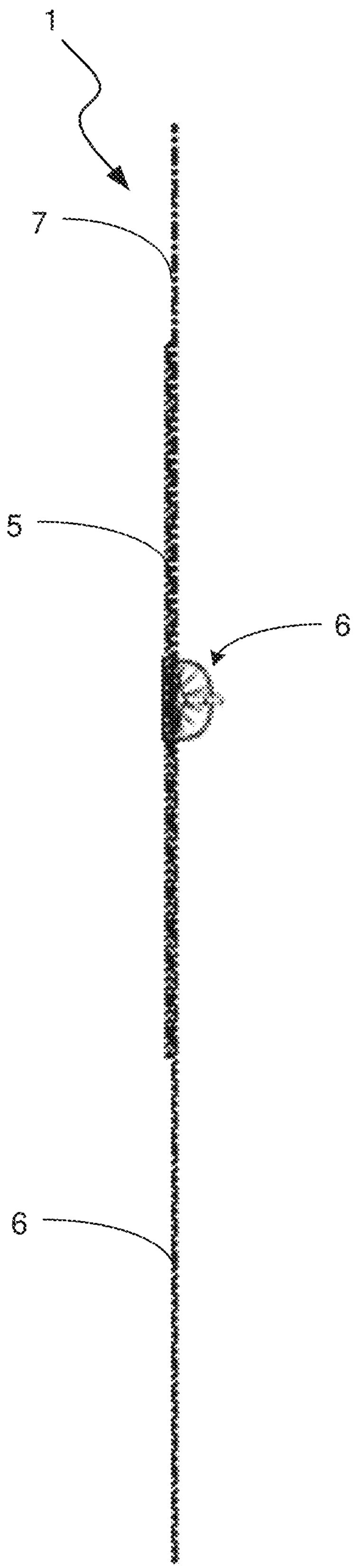
FIG. 7 is a bottom view of the golf towel system shown in FIG. 1 in accordance with a representative embodiment.
Figure 8:
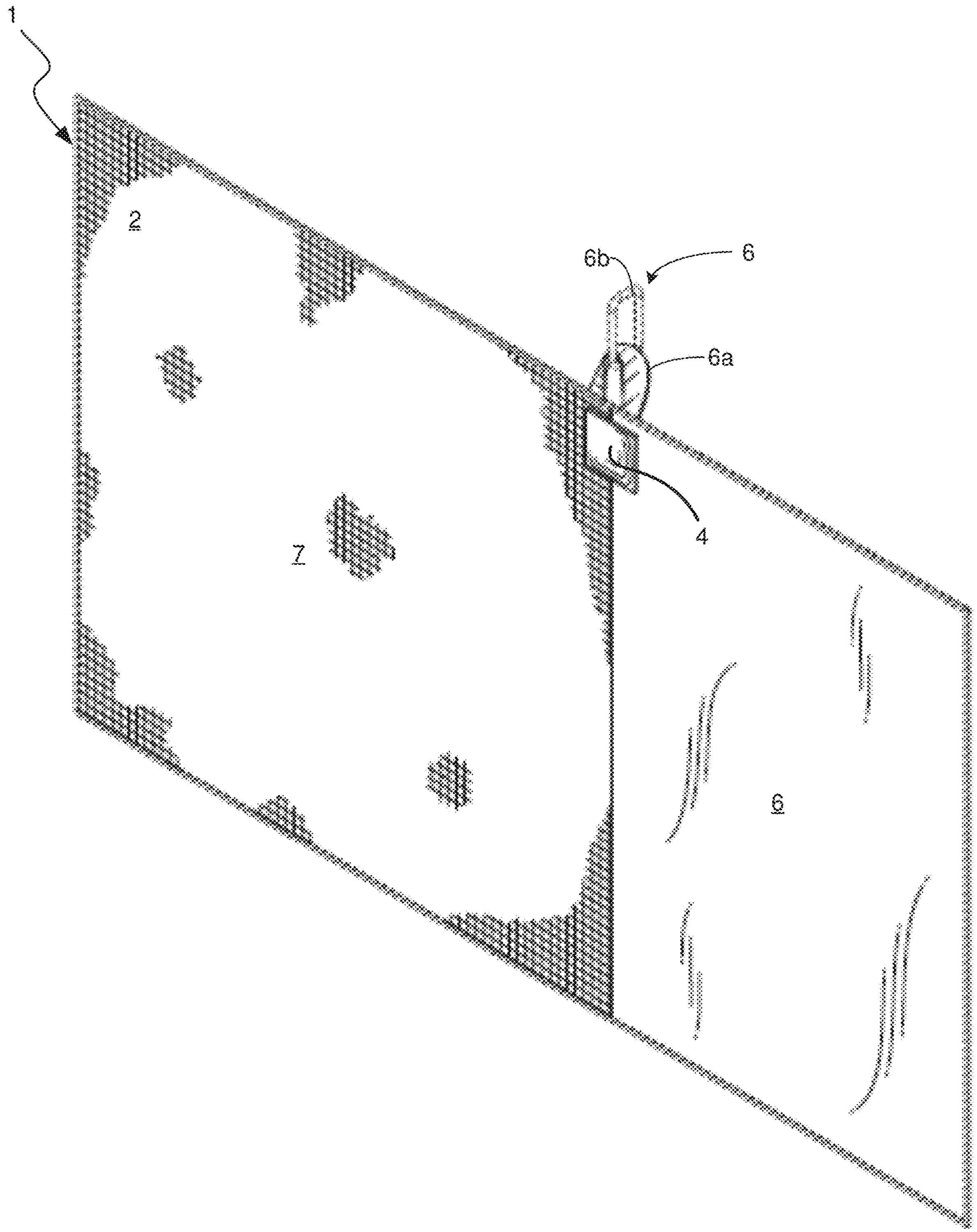
FIG. 8 is a top and front perspective view of the golf towel system shown in FIG. 1 in accordance with a representative embodiment.

Various embodiments, aspects and features of the present invention encompass a golf towel system and method of use. Various embodiments of the solution may also be configured and sized for sports applications other than, or in addition to, golf such as tennis or fishing, for example. As such, use of the term "golf towel" in this description shall not suggest that the scope of the solution is limited in application to the sport of golf. Further configurations and advantages of the solution will occur to those of skill in the art reviewing the figures and description that follows.

In the following detailed description, for purposes of explanation and not limitation, exemplary, or representative, embodiments disclosing specific details are set forth in order to provide a thorough understanding of the inventive principles and concepts. However, it will be apparent to one of ordinary skill in the art having the benefit of the present disclosure that other embodiments according to the present teachings that are not explicitly described or shown herein are within the scope of the appended claims. Moreover, descriptions of well-known apparatuses and methods may be omitted so as not to obscure the description of the exemplary embodiments. Such methods and apparatuses are clearly within the scope of the present teachings, as will be understood by those of skill in the art. It should also be understood that the word "example," as used herein, is intended to be non-exclusionary and non-limiting in nature.

The terminology used herein is for purposes of describing particular embodiments only and is not intended to be limiting. Any specifically-defined terms are in addition to the technical, scientific, or ordinary meanings of the defined terms as commonly understood and accepted in the relevant context.

The terms "a," "an" and "the" include both singular and plural referents, unless the context clearly dictates otherwise. Thus, for example, "a device" includes one device and plural devices. The terms "substantial" or "substantially" mean to within acceptable limits or degrees acceptable to those of skill in the art. For example, the term "substantially parallel to" means that a structure or device may not be made perfectly parallel to some other structure or device due to tolerances or imperfections in the process by which the structures or devices are made. The term "approximately" means to within an acceptable limit or amount to one of ordinary skill in the art.

Relative terms, such as "over," "above," "below," "top," "bottom," "front," "back," "left," "right," "upper" and "lower" may be used to describe the various elements' relationships to one another, as illustrated in the accompanying drawings. These relative terms are intended to encompass different orientations of the device and/or elements in addition to the orientation depicted in the drawings. For example, if the device were inverted with respect to the view in the drawings, an element described as "above" another element, for example, would now be below that element.

Referring to FIGS. 1-10, an exemplary, or representative, embodiment of a golf towel system 1 is illustrated. The golf towel system 1 according to this embodiment comprises a main towel 2, a differentiation mechanism 3, at least a first magnet feature 4, a detachable towel 5, a golf towel system attachment mechanism 6. The main towel 2 comprises at least a first towel portion 6 and a second towel portion 7. The first and second towel portions 6 and 7, respectively, have at least front sides 6*a* and 7*a*, rear sides 6*b* and 7*b*, top side sides 6*c* and 7*c*, bottom sides 6*d* and 7*d*, left sides 6*e* and 7*e* and right sides 6*f* and 7*f*, respectively. The left and right sides 6*e* and 7*f* of the first and second towel portions 6 and 7, respectively, are joined together.

The phrase "joined together," as that term is used herein, can define a number of configurations, including, for example, that the sides 6*e* and 7*f* are edges that are sewn together or secured together in some other way (e.g., fused), as well as there being no physical boundary between the sides 6*e* and 7*f* in cases where the portions 6 and 7 are integrally formed together as integral parts of the main towel 2. In the latter case, the sides 6*e* and 7*f* are joined together when the main towel 2 is manufactured, e.g., sewn or knitted.

The differentiation mechanism 3 can be any mechanism that delineates the first towel portion 6 from the second towel portion 7 to allow a user of the golf towel system 1 to readily differentiate the first towel portion 6 from the second towel portion 7 to facilitate different uses or purposes assigned by the user to the first and second towel portions 6 and 7, respectively. In accordance with a representative embodiment, the differentiation mechanism 3 comprises a color scheme of the golf towel system 1. The color scheme can be defined by at least the front sides 6*a* and 7*a* of the first and second towel portions 6 and 7, respectively, being of different colors to allow the user to easily differentiate between the portions 6 and 7.

In accordance with another representative embodiment, the differentiation mechanism 3 comprises a physical structure and/or a marking disposed along the interface between the towel portions 6 and 7 at the sides 6*e* and 7*f*, such as a brand name printed along the interface. In such cases, the portions 6 and 7 can be of the same color since a physical structure or markings are being used to enable the user to easily differentiate the first towel portion 6 from the second towel portion 7. In such cases, although it may be unnecessary to use different colors as the differentiation mechanism 3, different colors can be used in combination with the physical structure or markings. In some embodiments, the first and second towel portions 6 and 7, respectively, are made of different materials and in other embodiments that are made of the same material.

In accordance with this representative embodiment, the detachable towel 5 is configured to be removably attached to and detached from the main towel 2. To accomplish this goal, the detachable towel 5 has a second magnet feature 10 secured thereto that is oppositely polarized to the first magnet feature 4 (FIGS. 8 and 10) of the main towel 2. Thus, the first and second magnet features 4 and 10, respectively, are attracted to one another when the magnet features 4 and 10 are brought into close proximity with one another. The detachable towel 5 is removably attached to the main towel by bringing the detachable towel 5 into close proximity with or into contact with the main towel 2 such that the first and second magnet features 4 and 10, respectively, are brought into close proximity with one another. When this happens, magnetic forces exerted by the magnet features 4 and 10 on one another hold them together, thereby removably securing the detachable towel 5 to the main towel 2.

Figure 9:
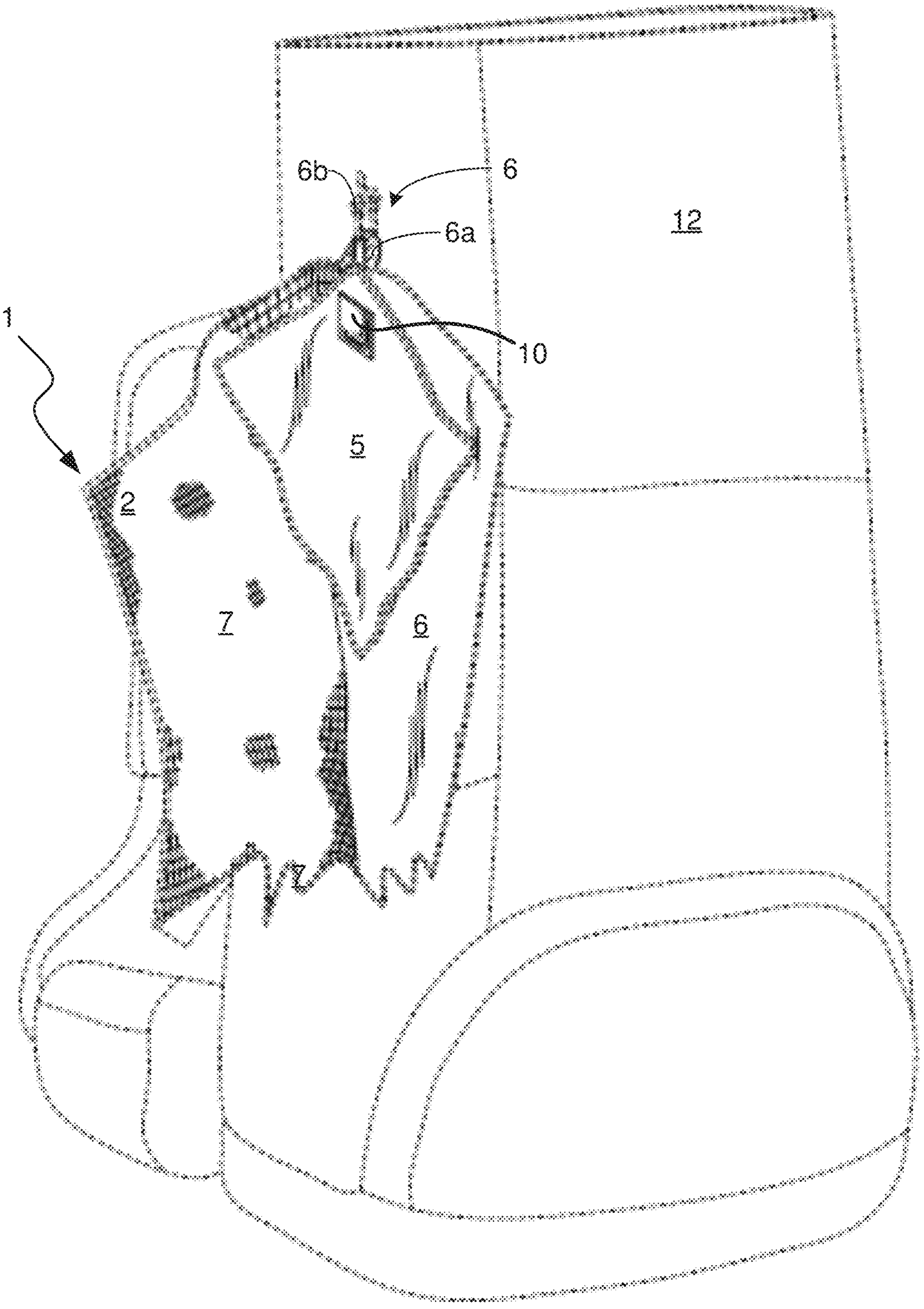
FIG. 9 is an illustration of the golf towel system of FIG. 1 deployed on a golfclub bag in accordance with a representative embodiment.
Figure 10:
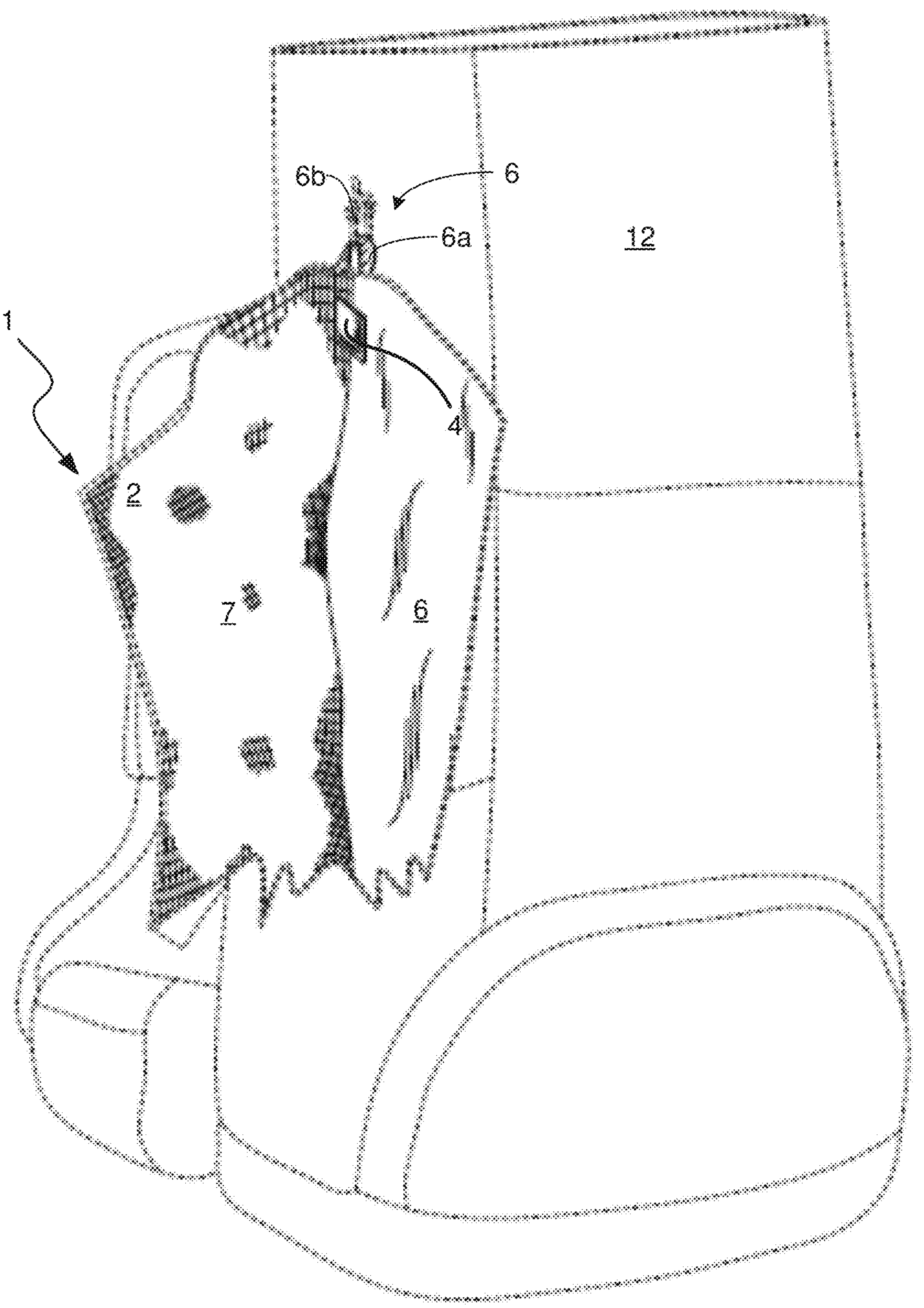
FIG. 10 is an illustration of the golf towel system of FIG. 1 deployed on a golfclub bag, with the detachable towel removed from the multipaneled main towel, in accordance with a representative embodiment.

When the golf towel system 1 is attached to an exterior device, such as the golf bag 12 shown in FIGS. 9 and 10, for example, the detachable towel 5 can be detached from the main towel 2 by pulling on the detachable towel 5 in a direction away from the main towel 2 and from the device to which the system 1 is attached with sufficient force to overcome the forces of attraction between the magnetic features 4 and 10.

With reference again to FIG. 1, the detachable towel 5 has a front side 5*a*, a rear side 5*b*, a top side 5*c*, a bottom side 5*d*, a left side 5*e*, and a right side 5*f*. The distance between the left and right sides 5*e* and 5*f*, respectively, of the detachable towel 5 measured in a direction perpendicular to the sides 5*e* and 5*f* corresponds to a length, L3, of the detachable towel 5. The distance between the top and bottom sides 5*c* and 5*d* of the detachable towel 5 measured in a direction perpendicular to the sides 5*c* and 5*d* corresponds to a width, W3, of the detachable towel 5.

In accordance with a representative embodiment, the first and second towel portions 6 and 7, respectively, are of different sizes and the detachable towel 5 is smaller than both of the towel portions 6 and 7. With reference to FIG. 1, the first towel portion 6 has a first width, W1, equal to a distance between the top and bottom sides 6*c* and 6*d*, respectively, measured in a direction perpendicular to the sides 6*c* and 6*d*. The second towel portion 7 has a second width, W2, equal to a distance between the top and bottom sides 7*c* and 7*d*, respectively, of the second towel portion 7 measured in a direction perpendicular to the sides 7*c* and 7*d*. The first towel portion 6 has a first length, L1, equal to a distance between the left and right sides 6*e* and 6*f*, respectively, of the first towel portion 6 measured in a direction perpendicular to the sides 6*e* and 6*f*. The second towel portion 7 has a second length, L2, equal to a distance between the left and right sides 7*e* and 7*f*, respectively, of the second towel portion 7 measured in a direction perpendicular to the sides 7*e* and 7*f*. In accordance with this representative embodiment, the first and second widths, W1 and W2, respectively, are substantially equal to one another, whereas the first and second lengths, L1 and L2, respectively, are unequal to one another. The second length L2 is substantially greater than the first length L1. Thus, the W1×L1 area of the first towel portion 6 is less than the W2×L2 are of the second towel portion 7.

In addition, in accordance with this representative embodiment, the W3×L3 area of the detachable towel 5 is significantly smaller than the W1×L1 area of the first towel portion 6, which, in accordance with this embodiment, is smaller than the W2×L2 area of the second towel portion 7.

In accordance with a representative embodiment, the first towel portion 6 is about 40% of the main towel 2, the second towel portion 7 is about 60% of the main towel 2, and the detachable towel 5 is about one-half the size of the first towel portion 6. Notably, and as envisioned above, not all embodiments of the solution will necessarily comprise towel portions 6 and 7 that are of different sizes or a detachable towel 5 that is different in size from that of the towel portions 6 and 7. It should be noted that the inventive principles and concepts are not limited with respect to the relative or absolute sizes of the main towel 2, of the towel portions 6 and 7 or of the detachable towel 5, as will be understood by those of skill in the art in view of the description provided herein.

The detachable towel 5 may be magnetically attached to the main towel 2 in the manner described above when not in use and, when needed, removed from the main towel 2 with an adequate tug from a user. It is envisioned that the detachable towel 5 of this exemplary embodiment may be conveniently carried by a user onto the course or green, or other location, without any need to detach the entire main towel 2 from the golf bag 12 or cart (not shown). In addition, the magnetic feature 4 allows the detachable towel 5 to be removably attached to virtually any metal object.

The golf towel system attachment mechanism 6 can be any suitable mechanism for allowing the golf towel system 1 to be removably attached to an external device, such as the golf bag 12 or a golf cart. One suitable configuration comprises a loop or handle 6*a* having first and second ends that are sewn onto or otherwise affixed to an edge of the main towel 2 and a clip 6*b*, such as a carabiner or hook that can be locked onto and unlocked from an external device such as an eyelet, a loop or another similar clip. The purpose and functionality of the golf towel attachment mechanism 6 is for "hanging" the towel system 1 from a golf bag 12 or other device.

The magnet feature 4 can be sewn into or otherwise affixed to a location on the main towel 2 adjacent to the mechanism 6, although it is envisioned that magnet features 4 and 10 may be fixed at any place in or on the detachable towel 5 and the main towel 2, respectively.

Figure 11:
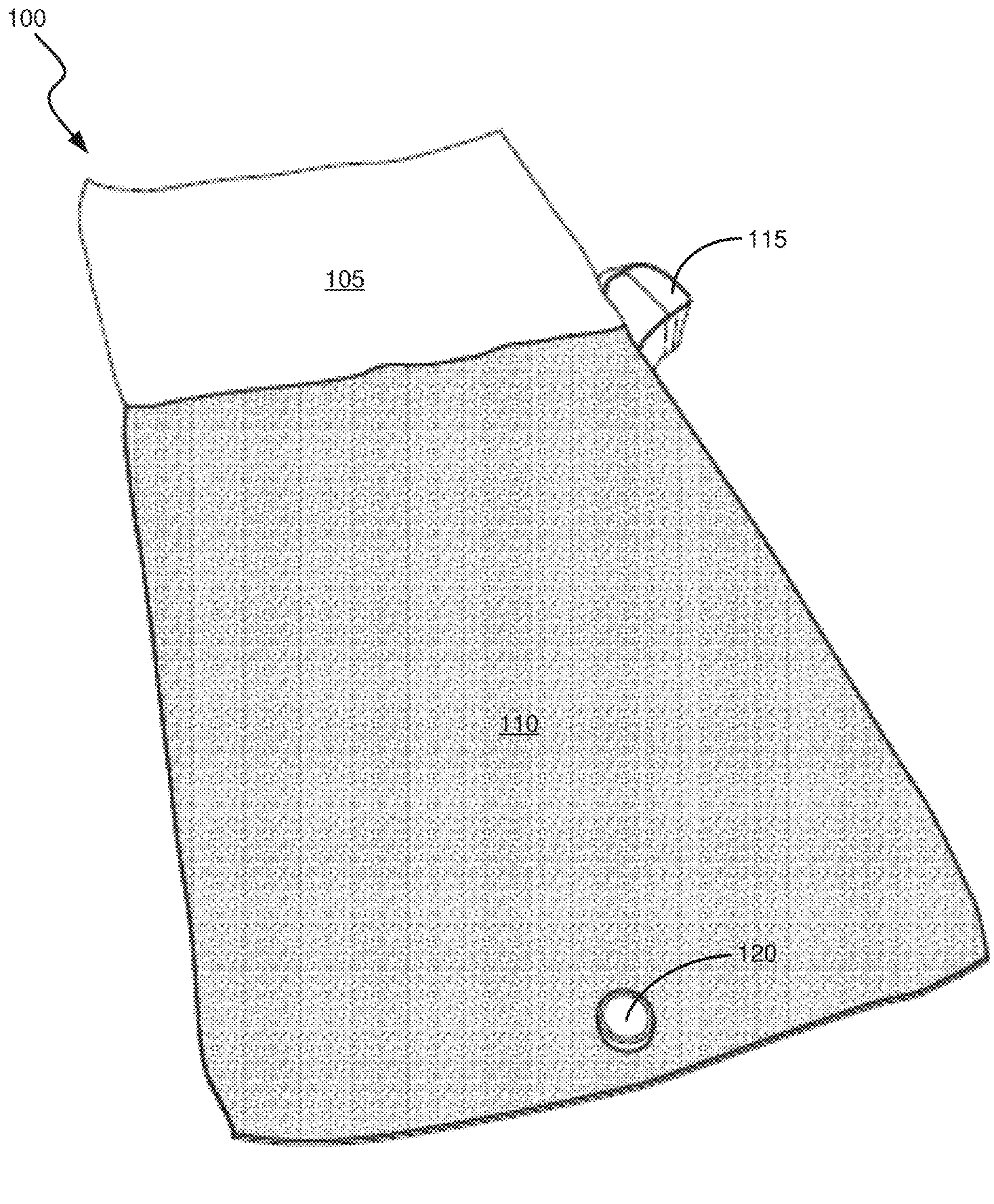
FIG. 11 illustrates another exemplary, or representative, embodiment of a golf towel system according to the inventive principles and concepts.

FIG. 11 illustrates another exemplary, or representative, embodiment of a golf towel system 100 according to the inventive principles and concepts. FIGS. 12-15 collectively and sequentially illustrate the golf towel system 100 shown in FIG. 11 being converted from a first state to a second state.

The golf towel system 100 comprises a main towel comprising a first towel portion 105 (shown in white) and a second towel portion 110 (shown shaded). It should be noted that while the system 100 comprises only two towel portions, other embodiments of the system 100 may comprise any number of towel portions, and each towel portion can be of a different color or of the same color. Additionally, the towel portions may be constructed of different materials or of the same material. Advantageously, when constructed from different materials, the first towel portion 105 may be constructed from a first material particularly suited for a first given application (such as, for example, absorbency) while the second towel portion 110 may be constructed from a second material particularly suited for a second given application (such as, for example, cleaning). It is preferred, however, that regardless of whether or not the towel portions 105 and 110 are constructed from the same or different materials, the differentiation mechanism of the towel system 100 in accordance with this embodiment can use different colors and/or different designs for the towel portions 105 and 110 to enable a user to quickly and easily distinguish one towel portion from another. For example, using different designs for the differentiation mechanism can mean using different shapes, materials of different thickness, and/or materials of different roughness for the towel portions 105 and 110.

Returning to the FIG. 11, the first towel portion 105 is about half the size of the second towel portion 110. Notably, not all embodiments of the solution will necessarily comprise towel portions of varying sizes. A loop or handle 115 is fixed along the edge of the main towel aspect and straddles a seam between portions 105 and 110. The purpose and functionality of the loop 115, beyond providing a convenient feature for "hanging" the towel system 100 from a golf bag or other device, will be better understood from the description of FIGS. 12-15 that follows.

In accordance with this embodiment, at a distal end of second towel portion 110, a magnet feature 120 is secured to the second towel portion 110 by, for example, sewing the magnet feature into a pocket or compartment of the second towel portion, although it is envisioned that magnet features such as magnet feature 120 may be fixed at any place in the towel portions. For example, it is envisioned that certain embodiments may incorporate the magnet feature 120 at or near the loop 115 in order to place the magnet feature 120 at a location that would be unlikely to interfere with a user's use of either portion of the towel system 100.

The placement of the magnet feature 120 weights the longer second portion 110 such that the towel hangs heavily. The magnet feature 120, regardless of placement, also enables the towel system to be removably mounted to a metal surface, such as a golf cart frame, so that a user may easily and quickly access the towel system 100.

Figure 12:
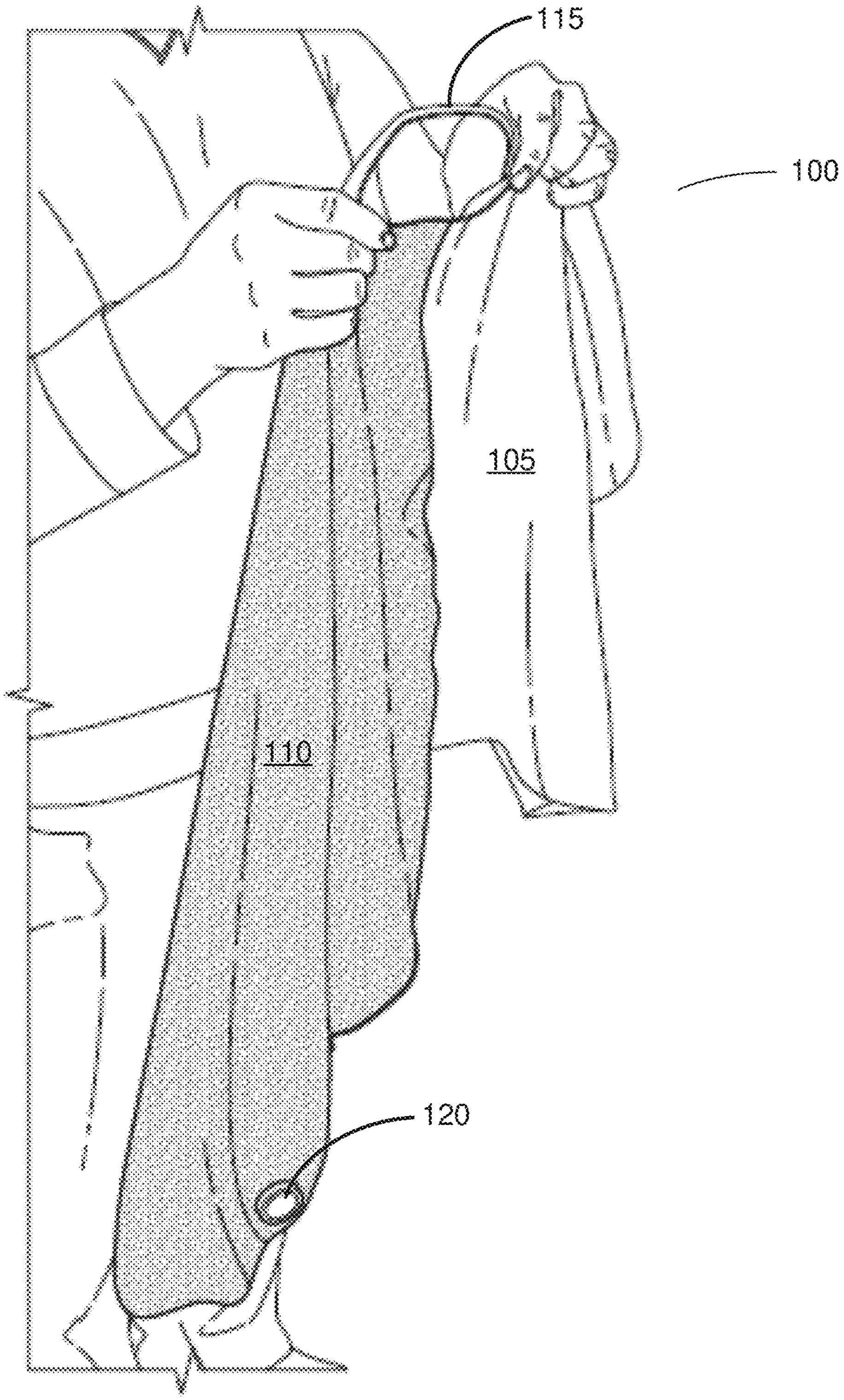
FIGS. 12-15 collectively and sequentially illustrate the golf towel system of FIG. 11 being converted from a first state to a second state.
Figure 13:
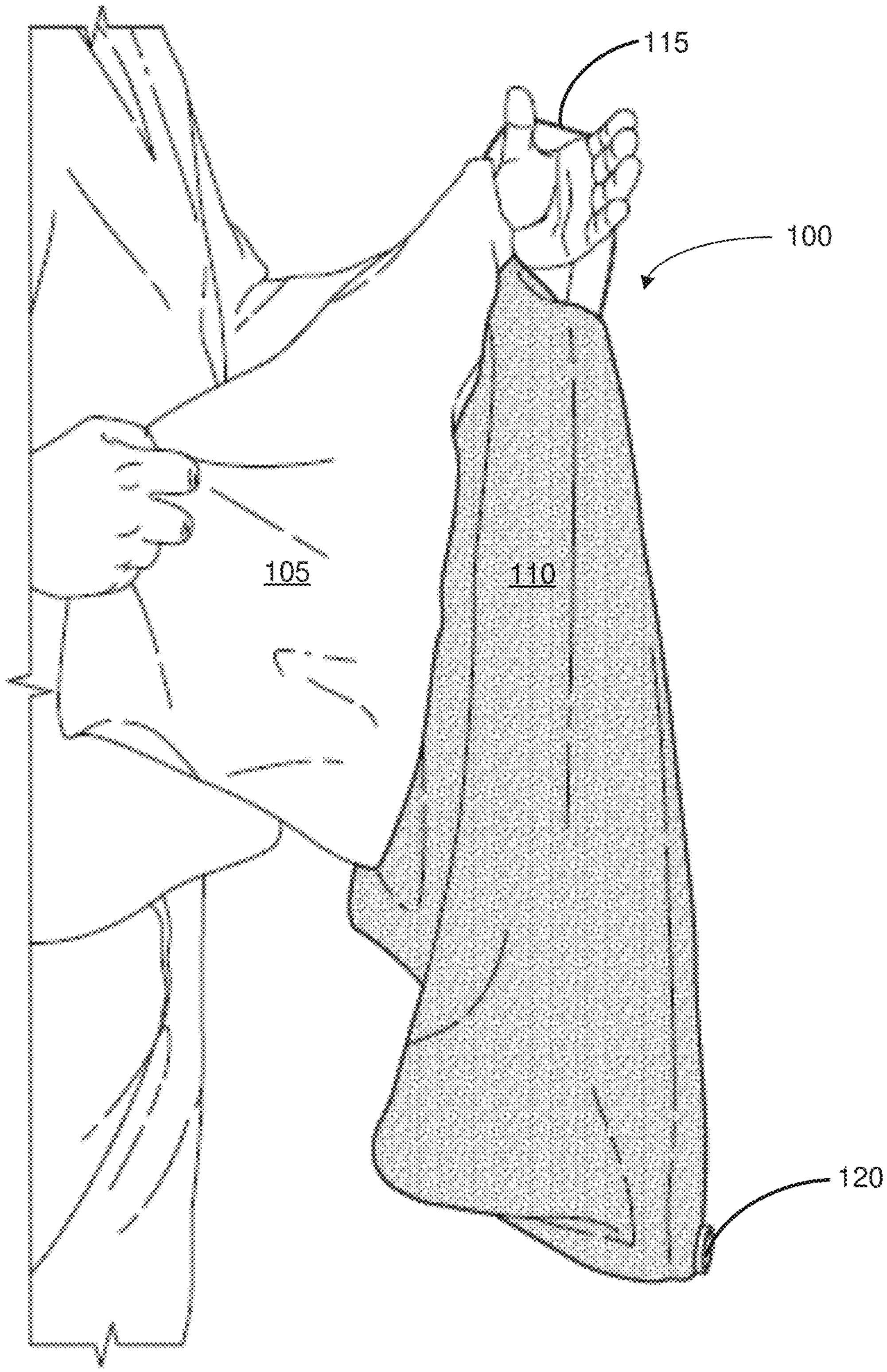
Figure 14:
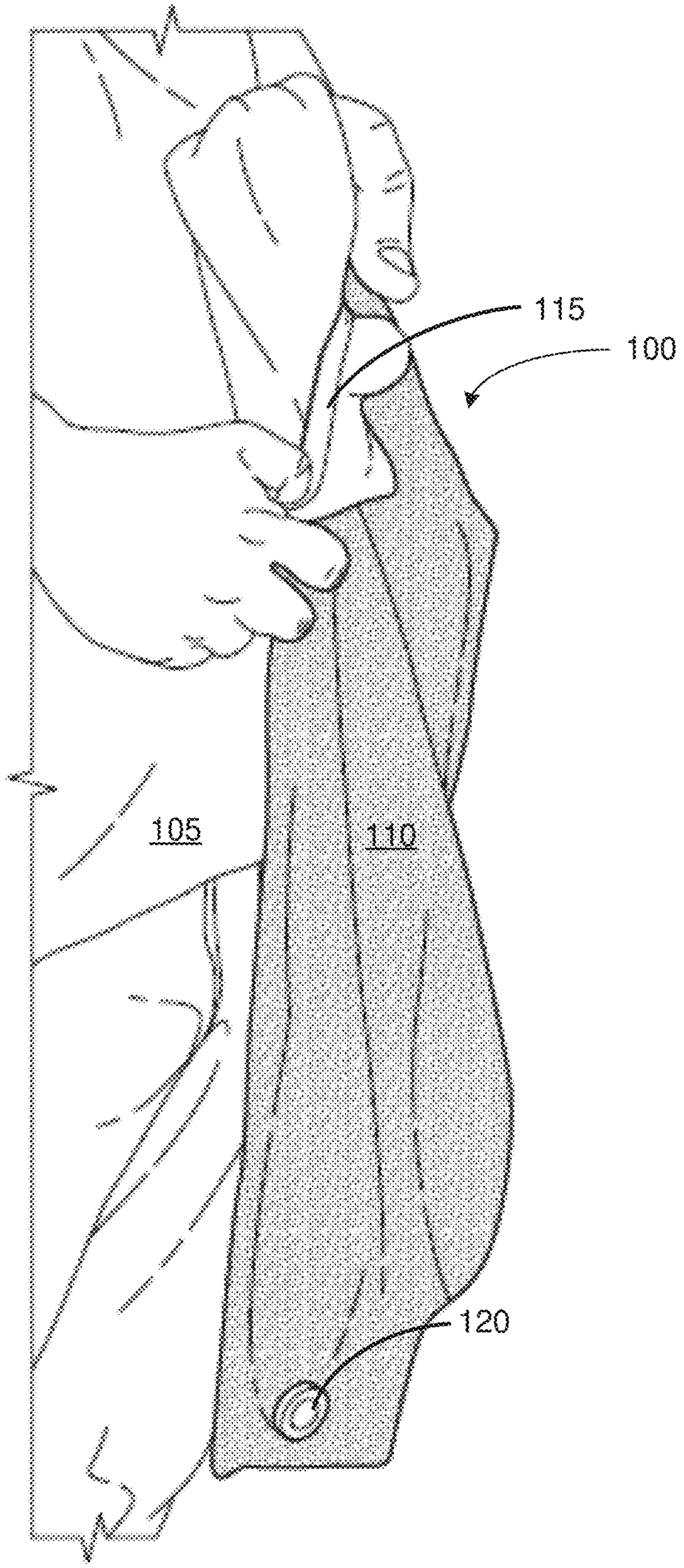
Figure 15:
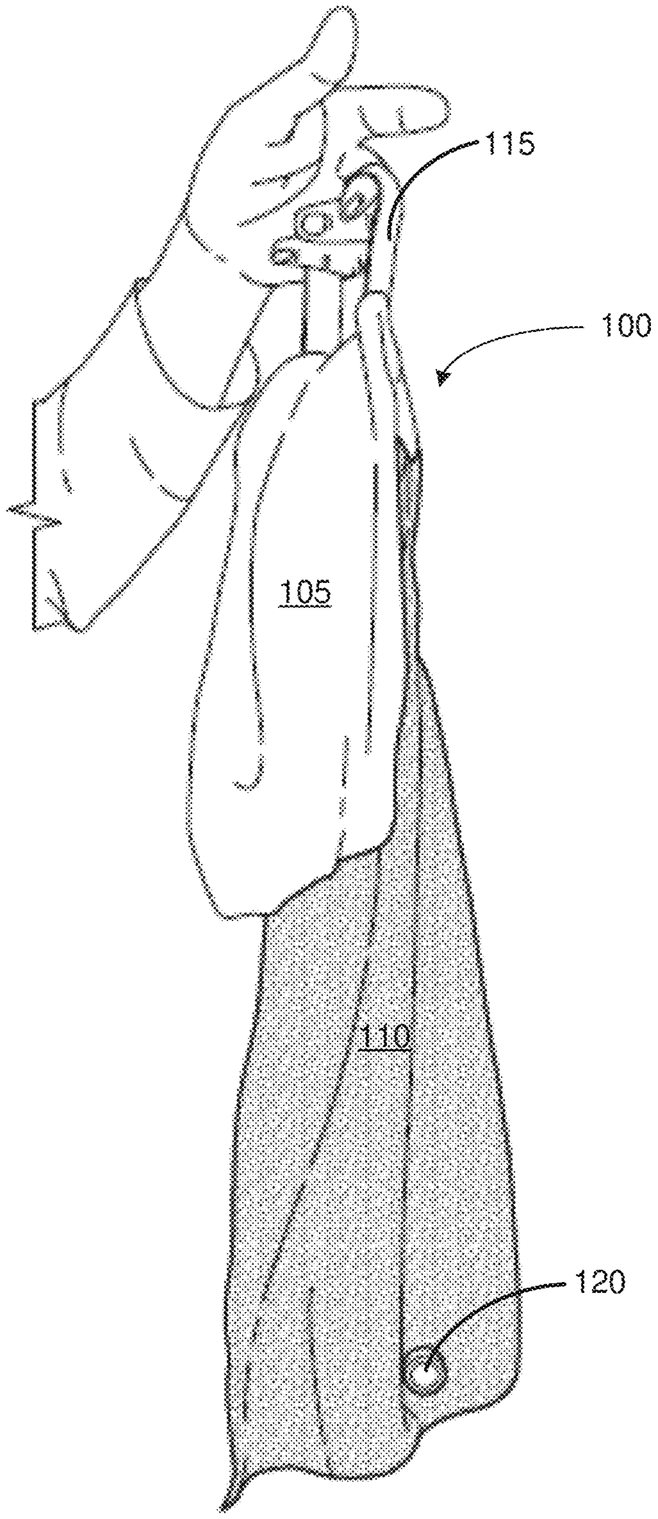

Turning now to FIGS. 12-15, it can be seen from a sequential viewing of the illustrations that the towel system 100 can be converted from the first state shown in FIG. 12 to the second state shown in FIG. 15 by pulling the towel portion 105 of the towel system 100 through the loop 115 in order to imitate a plain towel that has been "stuck through" a loop (a look that is visually appealing and provides some degree of physical separation between the towel portions 105 and 110). In the illustrations, the first towel portion 105 is pulled through the loop 115. Once converted to this second state wherein portion 105 has been pulled through the loop 115, the towel system 100 may be hung off a golf bag or other connection point that makes the towel system 100 easily accessible to a user. In addition, when the towel system 100 is in the second state, the overall length of the towel system 100 is shorter than when it is in the first state so that it does not drag on the ground when, for example, hanging from a golf bag being carried on a golf cart.

Although not shown in FIGS. 11-15, a detachable towel similar or identical to the detachable towel 5 shown in FIG. 1 may be included in the towel system 100 shown in FIGS. 11-15. In such cases, the magnet feature 120 may be located close to the loop 115 so that when the magnet feature 4 and the magnet feature 120 are magnetically coupled with one another, the overall length of the towel system 100 is shorter than it would be if the magnet feature 120 is disposed at the location on the second towel portion 110 shown in FIGS. 11-15.

The absolute and relative dimensions of the towel portions 105 and 110 and of the detachable towel, if any, may be the same as those described above with reference to FIGS. 1-10. It should be noted, however, that the inventive principles and concepts are not limited with regard to the absolute or relative dimensions of the towel systems 1 and 100 or their components, as will be understood by those of skill in the art in view of the description provided herein.

It should also be noted that while the inventive principles and concepts have been described with reference to using "magnetic features" as the mechanism for attaching the main towels 1 and 100 to metallic objects and/or for quickly and easily removably attaching the detachable towel 5 to the main towel 2, other quick attachment/detachment features can be used for this purpose. For example, the magnet features 4 and 10 can be replaced with respective loop and hook patches (e.g., Velcro patches) to provide a mechanism for attaching the detachable towel 5 to the main towel 2. Other quick attachment/detachment features can be used for this purpose, such as pairs of male and female snaps, for example. Magnet features are preferred for this purpose because of the ease and quickness with which they enable attachment and detachment to be performed with less than perfect alignment.

A system and method of use for a new and useful golf towel system have been described with reference to a few representative, or exemplary, embodiments that are provided by way of example and are not intended to limit the scope of the present disclosure. The described embodiments comprise different features, not all of which are required in all embodiments of the solution. Some embodiments of the solution utilize only some of the features or possible combinations of the features. Variations of embodiments of the solution that are described and embodiments of the solution comprising different combinations of features noted in the described embodiments will occur to persons of the art.

It will be appreciated by persons skilled in the art that a golf towel system according to the solution is not limited by what has been particularly shown and described herein above. Rather, the scope of the disclosed solution is defined by the claims that follow.

What is claimed is:

1. A towel system comprising:

a main towel comprising at least a first towel portion and a second towel portion, each towel portion having at least a front side, a rear side, a top side, a bottom side, a left side and a right side, wherein the left and right sides of the first and second towel portions, respectively, are joined together;

a differentiation mechanism configured to differentiate the first towel portion from the second towel portion to allow a user of the golf towel system to readily differentiate the first towel portion from the second towel portion to facilitate different uses or purposes by the user of the first and second towel portions;

at least a first quick attachment and detachment (attachment/detachment) feature secured to the main towel at a preselected location of the main towel;

a detachable towel configured to be removably attached to the main towel, the detachable towel having a second quick attachment/detachment feature secured thereto, the second quick attachment/detachment feature being configured to detachably couple with the first quick attachment/detachment feature; and a towel system attachment mechanism secured to the main towel, the towel system attachment mechanism being configured to be removably attached to a structure or device that is external to the golf towel system to thereby allow the golf towel system to be removably attached to the external structure or device.

2. The towel system of claim 1, wherein the first quick attachment/detachment feature comprises at least a first magnet feature.

3. The towel system of claim 1, wherein the differentiation mechanism comprises a color scheme of the golf towel system, the color scheme being defined by at least top surfaces of the first and second towel portions being of different colors.

4. The towel system of claim 3, wherein the first and second towel portions are made of different materials.

5. The towel system of claim 3, wherein the first and second towel portions are made of the same material.

6. The towel system of claim 1, wherein the first and second towel portions are of different sizes, the first towel portion having a first width, W1, equal to a distance between the top and bottom sides of the first towel portion, the second towel portion having a second width, W2, equal to a distance between the top and bottom sides of the second towel portion, the first towel portion having a first length, L1, equal to a distance between the left and right sides of the first towel portion, the second towel portion having a second length, L2, equal to a distance between the left and right sides of the second towel portion, and wherein the first and second widths, W1 and W2, respectively, are substantially equal, and wherein the first and second lengths, L1 and L2, respectively, are unequal, the second length L2 being substantially greater than the first length L1.

7. The towel system of claim 1, wherein the differentiation mechanism comprises at least one of a physical structure and a marking disposed along a border between the first and second towel portions where the left and right sides, respectively, of the first and second towel portions are joined to one another.

8. The towel system of claim 7, wherein the first and second towel portions are of the same color.

9. The towel system of claim 7, wherein the first and second towel portions are of different colors.

10. The towel system of claim 1, wherein both the first and second quick attachment/detachment features are first and second magnet features, respectively, and wherein the detachable towel is removably attached to the main towel by bringing the first and second magnet features into proximity with one another such that magnetic forces exerted by the first and second magnet features on one another maintain a removable attachment of the detachable towel to the main towel.

11. The towel system of claim 10, wherein the first magnet feature is secured to the main towel at a preselected location of the main towel near where the towel system attachment mechanism is secured to the main towel.

12. The towel system of claim 10, wherein the detachable towel is smaller in size than the main towel.

13. The towel system of claim 12, wherein the detachable towel has a front side, a rear side, a top side, a bottom side, a left side, and a right side, wherein a distance between the left and right sides of the detachable towel measured in a direction perpendicular to the left and right sides of the detachable towel corresponds to a length of the detachable towel, and wherein a distance between the top and bottom sides of the detachable towel measured in a direction perpendicular to the left and right sides of the detachable towel corresponds to a width of the detachable towel.

14. The towel system of claim 13, wherein the first and second towel portions are of different sizes, the first towel portion having a first width, W1, equal to a distance between the top and bottom sides of the first towel portion, the second towel portion having a second width, W2, equal to a distance between the top and bottom sides of the second towel portion, the first towel portion having a first length, L1, equal to a distance between the left and right sides of the first towel portion, the second towel portion having a second length, L2, equal to a distance between the left and right sides of the second towel portion, and wherein the first and second widths, W1 and W2, respectively, are substantially equal, and wherein the first and second lengths, L1 and L2, respectively, are unequal, the second length L2 being substantially greater than the first length L1, and wherein a width-by-length area of the detachable towel is significantly smaller than a W1-by-L1 area of the first towel portion.

15. The towel system of claim 14, wherein the differentiation mechanism comprises a color scheme of the golf towel system, the color scheme being defined by at least top surfaces of the first and second towel portions and of the detachable towel being of different colors.

16. The towel system of claim 13, wherein the first and second towel portions are substantially the same in size, the first towel portion having a first width, W1, equal to a distance between the top and bottom sides of the first towel portion, the second towel portion having a second width, W2, equal to a distance between the top and bottom sides of the second towel portion, the first towel portion having a first length, L1, equal to a distance between the left and right sides of the first towel portion, the second towel portion having a second length, L2, equal to a distance between the left and right sides of the second towel portion, and wherein the first and second widths, W1 and W2, respectively, are substantially equal, and wherein the first and second lengths, L1 and L2, respectively, are substantially equal, and wherein a width-by-length area of the detachable towel is significantly smaller than a W1-by-L1 area of the first towel portion.

17. The towel system of claim 16, wherein the differentiation mechanism comprises a color scheme of the golf towel system, the color scheme being defined by at least top surfaces of the first and second towel portions and of the detachable towel being of different colors.

18. The towel system of claim 16, wherein the differentiation mechanism comprises at least one of a physical structure and a marking disposed along a border between the first and second power portions where the left and right sides of the first and second towel portions, respectively, are joined to one another, and wherein at least a top surface of the detachable towel is of a different color than the top surfaces of the first and second towel portions.

19. A towel system comprising:

- a main towel comprising at least a first towel portion and a second towel portion, each towel portion having at least a front side, a rear side, a top side, a bottom side, a left side and a right side, wherein the left and right sides of the first and second towel portions, respectively, are joined together;
- a differentiation mechanism configured to differentiate the first towel portion from the second towel portion to allow a user of the golf towel system to readily differentiate the first towel portion from the second towel portion to facilitate different uses or purposes by the user of the first and second towel portions;
- at least a first quick attachment and detachment (attachment/detachment) feature secured to the main towel at a preselected location of the main towel;
- a detachable towel configured to be removably attached to the main towel, the detachable towel having a second quick attachment/detachment feature secured thereto, the second quick attachment/detachment feature being configured to detachably couple with the first quick attachment/detachment feature to enable the detachable towel to be removably attached to the main towel; and a towel system attachment mechanism secured to the main towel, the towel system attachment mechanism being configured to be removably attached to a structure or device that is external to the golf towel system to thereby allow the golf towel system to be removably attached to the external structure or device.

* * * * *